R. LA FRANCE.
VACUUM CAPACITY DEVICE FOR GLASS MACHINES
APPLICATION FILED DEC. 10, 1920.
1,413,742.
Patented Apr. 25, 1922.
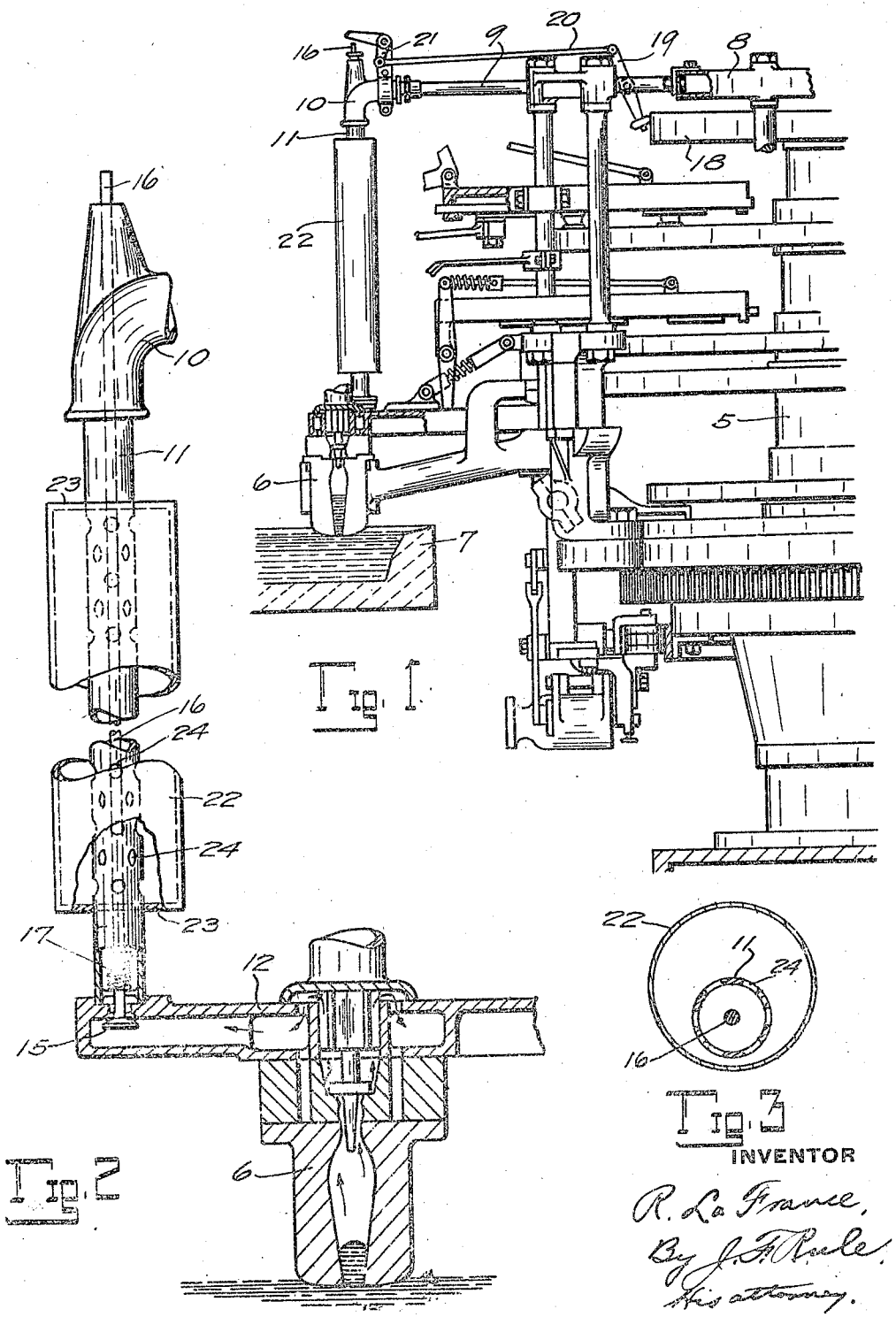
INVENTOR

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

VACUUM CAPACITY DEVICE FOR GLASS MACHINES.

1,413,742.  Specification of Letters Patent.  Patented Apr. 25, 1922.

Application filed December 10, 1920. Serial No. 429,637.

*To all whom it may concern:*

Be it known that I, RICHARD LA FRANCE, a citizen of the United States, residing at Toledo, in the county of Lucas and State of Ohio, have invented new and useful Improvements in Vacuum Capacity Devices for Glass Machines, of which the following is a specification.

My invention relates to improvements in glass forming machines and more particularly to machines of the type in which suction is employed for charging the molds with molten glass. The invention is herein shown as applied to a machine of the Owens type in which a series of gathering molds are brought successively over a tank containing molten glass into which the lower ends of the molds are dipped, the air being then exhausted from the molds, causing the glass to enter the molds. Vacuum pipes lead from the heads which carry the molds, to a central distributing head or drum on the mold carriage, in which drum a vacuum is maintained.

The pipes through which the air is conducted from the molds to the central vacuum head are necessarily of considerable length and restrict the movement of the exhausting air to a certain degree, so that the movement of the glass into the gathering molds, due to the suctional action, is not as quick as is desirable. In modern machines of the Owens type which rotate continuously with considerable rapidity and in which the gathering molds travel in the same path and are brought in quick succession into contact with the supply of glass and only remain in contact with the glass a very brief interval, it is particularly desirable that the molds be filled as quickly as possible and that the full effect of the suction shall be maintained at the gathering point throughout the gathering operation.

An object of the present invention is to obtain this quick action by preventing any substantial reduction in the degree of vacuum at the mold cavities, due to the restricted passageways through which the exhaust takes place. I attain this object by the use of capacity tanks or reservoirs located adjacent to the gathering molds and in communication with the pipes through which the air is exhausted, whereby the effect of such restricted flow is practically overcome.

Other features of the invention will appear hereinafter.

In the accompanying drawings:

Figure 1 is an elevation of a portion of a glass gathering and blowing machine of the Owens type, to which my invention is applied.

Figure 2 is a part sectional elevation on a larger scale of a gathering mold, capacity tank and associated parts.

Figure 3 is a sectional view of a capacity tank and the pipe extending therethrough.

Reference may be had to the patent to Bock, Number 870,664, November 12, 1907, and patent to La France, Number 1,185,687, June 6, 1916, for a full disclosure of the construction and operation of this type of machine.

The machine comprises a carriage rotatable about a central vertical standard or column 5. An annular series of gathering molds 6 carried with the carriage are brought successively over a tank 7 containing molten glass and dipped down into contact with the glass. A vacuum distributing head or drum 8 mounted on the carriage is connected to any suitable source of vacuum or means for exhausting the air therefrom. Pipe sections 9 extending radially from said head are connected through elbows 10 to the upper ends of vertical pipe sections 11, the lower ends of which communicate with a vacuum head 12 over the mold. The lower end of each pipe 11 is closed, except when a charge is being drawn into the mold, by a valve 15 having a valve stem 16 extending vertically through and beyond the pipe 11. The valve is normally held to its seat by a spring 17. When the mold is brought into contact with the glass in the tank for gathering a charge, the valve 15 is automatically opened by a cam 18 which operates through a lever 19, link 20 and bell crank 21, the latter comprising an arm which moves the stem 16 downward and opens the valve. This establishes a connection from the vacuum drum 8 to the mold so that the air is exhausted from the mold and the latter filled with glass by the surrounding atmospheric pressure.

It is found in practice that the resistance to the passage of the air from the mold through the pipe to the vacuum head is sufficient to cause an appreciable retardation or slowing of the charging action. To overcome this, a vacuum capacity tank 22 is provided adjacent the mold. As shown, this tank surrounds the pipe 11, the ends 23 of the tank having an air tight connection with the pipe. Communication between the pipe and tank is supplied through a multiplicity of perforations 24 in the walls of the pipe. As there is no appreciable resistance to the passage of the air from the mold to the capacity tank, the throttling or retarding action above mentioned is overcome. In other words, the full head of vacuum is maintained at the mold throughout the charging thereof, permitting the mold to be rapidly filled.

Modifications may be resorted to within the spirit and scope of my invention.

What I claim is:

1. In a glass forming machine, the combination of a carriage, a mold thereon, a vacuum drum, a pipe leading therefrom to the mold, and a capacity reservoir intermediate said drum and the mold, said reservoir being in communication with the mold cavity and with said drum.

2. In a glass forming machine, the combination of a carriage, a mold thereon, a vacuum drum, a pipe leading therefrom to the mold, a valve controlling communication between the mold cavity and said pipe, and a vacuum capacity tank open to said pipe at a point between the valve and said drum.

3. In a glass forming machine, the combination of a suction gathering mold, means for exhausting the air therefrom to charge the mold, comprising a pipe or conduit leading from the mold to a source of vacuum, and a vacuum capacity device adjacent the mold and in communication with the mold cavity.

4. In a glass forming machine, the combination of a suction gathering mold, means for exhausting the air therefrom to charge the mold, comprising a pipe or conduit leading from the mold to a source of vacuum, a vacuum capacity device adjacent the mold and in communication with the mold cavity, and a valve controlling the passage of air from the mold through said conduit and to said capacity device.

5. In a glass forming machine, the combination of a suction gathering mold, a pipe communicating with the mold cavity and leading to a source of vacuum or reduced air pressure, and a vacuum capacity device opening into said pipe between the mold cavity and said source of reduced pressure.

6. In a glass forming machine, the combination of a suction gathering mold, a pipe communicating with the mold cavity and leading to a source of vacuum or reduced air pressure, a vacuum capacity tank through which said pipe extends, and a valve in said pipe between the tank and the mold.

7. In a glass forming machine comprising in combination, a rotary carriage, suction gathering molds carried thereby to be brought successively into contact with a supply of molten glass, a vacuum distributing head or drum on the carriage, pipes leading from said drum to the molds through which the air is exhausted from the molds for charging the latter, vacuum capacity drums in communication with said pipes, and valves controlling the passage of air from the mold cavities through said pipes.

8. In a glass forming machine, the combination of a suction gathering mold, a vertical pipe having connections at its lower end with the mold, a vacuum capacity tank surrounding said pipe, the latter having a multiplicity of perforations in its walls within the tank, and means for exhausting the air from the mold through said pipe.

9. In a glass forming machine, the combination of a suction gathering mold, a vertical pipe having connections at its lower end with the mold, a vacuum capacity tank surrounding said pipe, the latter having a multiplicity of perforations in its walls within the tank, means for exhausting the air from the mold through said pipe, a valve at the lower end of the pipe, and automatic means for opening and closing the valve.

Signed at Toledo, in the county of Lucas and State of Ohio, this 7th day of December, 1920.

RICHARD LA FRANCE.